US010067809B2

(12) United States Patent
Cook et al.

(10) Patent No.: US 10,067,809 B2
(45) Date of Patent: *Sep. 4, 2018

(54) SYSTEM AND METHOD FOR BATCH TRANSPORT USING HARDWARE ACCELERATORS

(71) Applicant: INTERNATIONAL BUSINESS MACHINES CORPORATION, Armonk, NY (US)

(72) Inventors: Alexander Cook, Rochester, MN (US); Jonathan L. Kaus, Rochester, MN (US); David M. Koster, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 15/133,438

(22) Filed: Apr. 20, 2016

(65) Prior Publication Data

US 2017/0308416 A1  Oct. 26, 2017

(51) Int. Cl.
| | | |
|---|---|---|
| G06F 3/00 | (2006.01) | |
| G06F 9/44 | (2018.01) | |
| G06F 9/46 | (2006.01) | |
| G06F 13/00 | (2006.01) | |
| G06F 9/54 | (2006.01) | |

(52) U.S. Cl.
CPC ............. *G06F 9/546* (2013.01); *G06F 9/543* (2013.01)

(58) Field of Classification Search
CPC ........................................................ G06F 9/546
USPC ........................................................... 719/314
See application file for complete search history.

(56) References Cited

U.S. PATENT DOCUMENTS

| | | | |
|---|---|---|---|
| 2003/0028661 A1 | 2/2003 | Burger et al. | |
| 2004/0160960 A1 | 8/2004 | Monta et al. | |
| 2008/0244169 A1 | 10/2008 | Dawson et al. | |
| 2010/0142516 A1 | 6/2010 | Lawson et al. | |
| 2012/0030421 A1 | 2/2012 | Chang et al. | |
| 2012/0204000 A1* | 8/2012 | Biran ................ G06F 17/30985 | |
| | | | 711/202 |
| 2013/0111084 A1 | 5/2013 | Wang | |

(Continued)

FOREIGN PATENT DOCUMENTS

| | | |
|---|---|---|
| WO | 2002063421 A2 | 8/2002 |
| WO | 2006126090 A2 | 11/2006 |

(Continued)

OTHER PUBLICATIONS

IBM Patent Applications Listing for Applications to Be Treated as Related, filed Mar. 13, 2017, pp. 1-2.

(Continued)

*Primary Examiner* — Timothy A Mudrick
(74) *Attorney, Agent, or Firm* — Brian J. Colandreo, Esq.; Jeffrey T. Placker, Esq.; Holland & Knight LLP

(57) ABSTRACT

A method, computer program product, and computer system for maintaining, at a computing device, one or more tuples in a software-level queue. The one or more tuples may be transported as a batch of the one or more tuples from the software-level queue to a first queue for processing at a hardware accelerator. After processing the one or more tuples, the one or more tuples may be transported from the first queue to a second queue at the hardware accelerator. The one or more tuples may be transported from the second queue to a next location.

13 Claims, 4 Drawing Sheets

(56) References Cited

U.S. PATENT DOCUMENTS

| | | | |
|---|---|---|---|
| 2013/0125127 A1* | 5/2013 | Mital | G06F 9/46 |
| | | | 718/102 |
| 2014/0026141 A1 | 1/2014 | Lippett | |
| 2014/0105208 A1 | 4/2014 | Pope et al. | |
| 2014/0344326 A1 | 11/2014 | Kamath et al. | |
| 2014/0351551 A1 | 11/2014 | Doerr et al. | |
| 2015/0100720 A1 | 4/2015 | Flynn et al. | |
| 2015/0347185 A1 | 12/2015 | Holt et al. | |

FOREIGN PATENT DOCUMENTS

| | | | |
|---|---|---|---|
| WO | 2007044562 A1 | 4/2007 | |
| WO | 2013192236 A1 | 12/2013 | |

OTHER PUBLICATIONS

Weber et al., "Comparing Hardware Accelerators in Scientific Applications: A Case Study," IEEE Transactions on Parallel and Distributed Systems, vol. 22, No. 1, Jan. 2011, pp. 58-68.

Chai et al. "Extending a Stream Programming Paradigm to Hardware Accelerator Platforms," Motorola General Business Information, pp. 1-34.

Appendix P: IBM Patent Applications to Be Treated as Related, filed Apr. 20, 2016, pp. 1-2.

For Examiner's Eyes Only, Related U.S. Appl. No. 15/133,466, filed Apr. 20, 2016, entitled System and for Hardware Acceleration Method for Operator Parallelization With Streams, pp. 1-30.

* cited by examiner

SYSTEM AND METHOD FOR BATCH TRANSPORT USING HARDWARE ACCELERATORS

BACKGROUND

In certain environments (e.g., a distributed programming environment), the response times of the application, or the overall throughput that the environment may process, may be dictated by the slowest part of that distributed environment. For instance, with Streams programming, the overall operator graph may be slowed down by the weakest link. This weakest link may be evidenced by the "backpressure" that exists, which may be effectively the queue of tuples waiting to be processed one-by-one by an operator.

BRIEF SUMMARY OF DISCLOSURE

In one example implementation, a method, performed by one or more computing devices, may include but is not limited to maintaining, at a computing device, one or more tuples in a software-level queue. The one or more tuples may be transported as a batch of the one or more tuples from the software-level queue to a first queue for processing at a hardware accelerator. After processing the one or more tuples, the one or more tuples may be transported from the first queue to a second queue at the hardware accelerator. The one or more tuples may be transported from the second queue to a next location.

One or more of the following example features may be included. The first queue may include a hardware accelerator-level backpressure queue. The second queue may include a hardware accelerator-level result queue. The next location may include a software layer to a subsequent operator. The hardware accelerator may include a Field-Programmable Gate Array. An API transport layer between the software-level queue and the first queue may transport the one or more tuples from the software-level queue to the first queue for processing. An API transport layer between the second queue and the next location may manage changing the batch of the one or more tuples into a stream of the one or more tuples.

In another example implementation, a computing system may include one or more processors and one or more memories configured to perform operations that may include but are not limited to maintaining one or more tuples in a software-level queue. The one or more tuples may be transported as a batch of the one or more tuples from the software-level queue to a first queue for processing at a hardware accelerator. After processing the one or more tuples, the one or more tuples may be transported from the first queue to a second queue at the hardware accelerator. The one or more tuples may be transported from the second queue to a next location.

One or more of the following example features may be included. The first queue may include a hardware accelerator-level backpressure queue. The second queue may include a hardware accelerator-level result queue. The next location may include a software layer to a subsequent operator. The hardware accelerator may include a Field-Programmable Gate Array. An API transport layer between the software-level queue and the first queue may transport the one or more tuples from the software-level queue to the first queue for processing. An API transport layer between the second queue and the next location may manage changing the batch of the one or more tuples into a stream of the one or more tuples.

In another example implementation, a computer program product may reside on a computer readable storage medium having a plurality of instructions stored thereon which, when executed across one or more processors, may cause at least a portion of the one or more processors to perform operations that may include but are not limited to maintaining one or more tuples in a software-level queue. The one or more tuples may be transported as a batch of the one or more tuples from the software-level queue to a first queue for processing at a hardware accelerator. After processing the one or more tuples, the one or more tuples may be transported from the first queue to a second queue at the hardware accelerator. The one or more tuples may be transported from the second queue to a next location.

One or more of the following example features may be included. The first queue may include a hardware accelerator-level backpressure queue. The second queue may include a hardware accelerator-level result queue. The next location may include a software layer to a subsequent operator. The hardware accelerator may include a Field-Programmable Gate Array. An API transport layer between the software-level queue and the first queue may transport the one or more tuples from the software-level queue to the first queue for processing. An API transport layer between the second queue and the next location may manage changing the batch of the one or more tuples into a stream of the one or more tuples.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
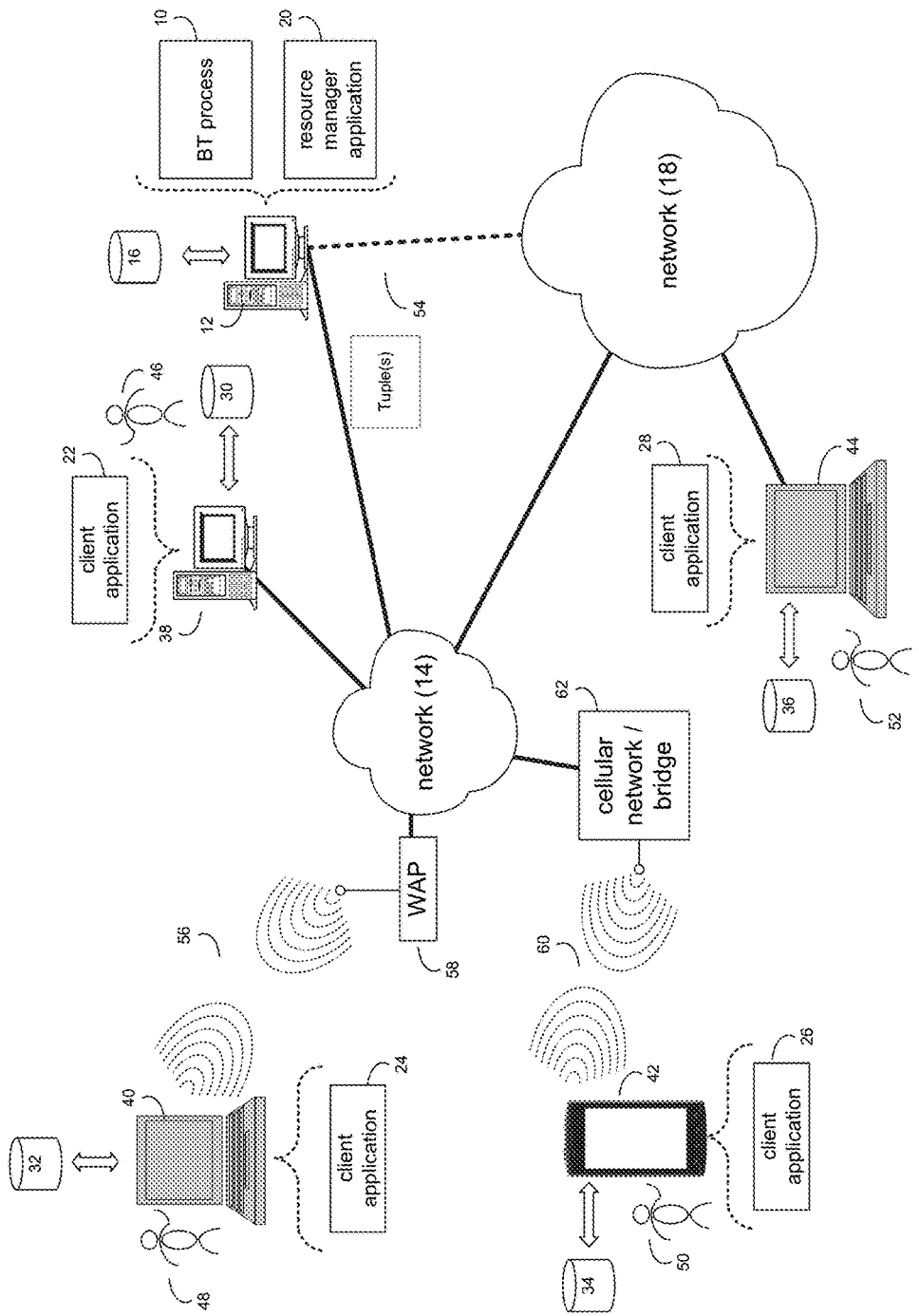
FIG. 1 is an example diagrammatic view of a batch transport process coupled to a distributed computing network according to one or more example implementations of the disclosure.

System Overview:

As will be discussed in greater detail, the present disclosure may include techniques to intelligently handle backpressure at programmable hardware locations, e.g., within a Streams operator graph by using dynamic batch transport. In some implementations, the disclosure may make use of the fact that the amount of time that may be needed to transport data to and from a FPGA may have a large constant term that may often outweigh the small linear term based on the size of that data (e.g., TransportTime=50 microseconds+1 microsecond*NumberOfTuples). The time needed to transport a single tuple may potentially be on the same order necessary to process many tuples using the FPGA.

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown batch transport (BT) process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, BT process 10 may maintain, at a computing device, one or more tuples in a software-level queue. The one or more tuples may be transported as a batch of the one or more tuples from the software-level queue to a first queue for processing at a hardware accelerator. After processing the one or more tuples, the one or more tuples may be transported from the first queue to a second queue at the hardware accelerator. The one or more tuples may be transported from the second queue to a next location.

In some implementations, the instruction sets and subroutines of BT process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. In some implementations, BT process 10 may be a component of the data store, a standalone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

In some implementations, Computer 12 may execute a resource manager application (e.g., resource manager application 20), examples of which may include, but are not limited to, e.g., any application that allows for allocation (and/or temporary allocation loaning) and/or requesting back of machines (and their resources, such as, e.g., primary memory and secondary memory, processor(s), bandwidth, graphics and sound, networks, cache, etc.) at each of the Map and Reduce steps (or otherwise) to attempt to alleviate stresses placed on a subset of the computing cluster. BT process 10 and/or resource manager application 20 may be accessed via client applications 22, 24, 26, 28. BT process 10 may be a standalone application, or may be an applet/application/script/extension that may interact with and/or be executed within resource manager application 20, a component of resource manager application 20, and/or one or more of client applications 22, 24, 26, 28. Resource manager application 20 may be a standalone application, or may be an applet/application/script/extension that may interact with and/or be executed within BT process 10, a component of BT process 10, and/or one or more of client applications 22, 24, 26, 28. One or more of client applications 22, 24, 26, 28 may be a standalone application, or may be an applet/application/script/extension that may interact with and/or be executed within and/or be a component of BT process 10 and/or resource manager application 20. Examples of client applications 22, 24, 26, 28 may include, but are not limited to, e.g., any application that allows for allocation (and/or temporary allocation loaning) and/or requesting back of machines (and their resources, such as, e.g., primary memory and secondary memory, processor(s), bandwidth, graphics and sound, networks, cache, etc.) at each of the Map and Reduce steps (or otherwise) to attempt to alleviate stresses placed on a subset of the computing cluster, a standard and/or mobile web browser, an email application (e.g., an email client application), a textual and/or a graphical user interface, a customized web browser, a plugin, an Application Programming Interface (API), a streaming application platform, or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of BT process 10 (and vice versa). Accordingly, BT process 10 may be a purely server-side application, a purely client-side application, or a hybrid server-side/client-side application that is cooperatively executed by one or more of client applications 22, 24, 26, 28 and/or BT process 10.

One or more of client applications 22, 24, 26, 28 may be configured to effectuate some or all of the functionality of resource manager application 20 (and vice versa). Accordingly, resource manager application 20 may be a purely server-side application, a purely client-side application, or a hybrid server-side/client-side application that is cooperatively executed by one or more of client applications 22, 24, 26, 28 and/or resource manager application 20. As one or more of client applications 22, 24, 26, 28, BT process 10, and resource manager application 20, taken singly or in any combination, may effectuate some or all of the same functionality, any description of effectuating such functionality via one or more of client applications 22, 24, 26, 28, BT process 10, resource manager application 20, or combination thereof, and any described interaction(s) between one or more of client applications 22, 24, 26, 28, BT process 10, resource manager application 20, or combination thereof to effectuate such functionality, should be taken as an example only and not to limit the scope of the disclosure.

Users 46, 48, 50, 52 may access computer 12 and BT process 10 (e.g., using one or more of client electronic devices 38, 40, 42, 44) directly through network 14 or through secondary network 18. Further, computer 12 may be connected to network 14 through secondary network 18, as illustrated with phantom link line 54. BT process 10 may include one or more user interfaces, such as browsers and textual or graphical user interfaces, through which users 46, 48, 50, 52 may access BT process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
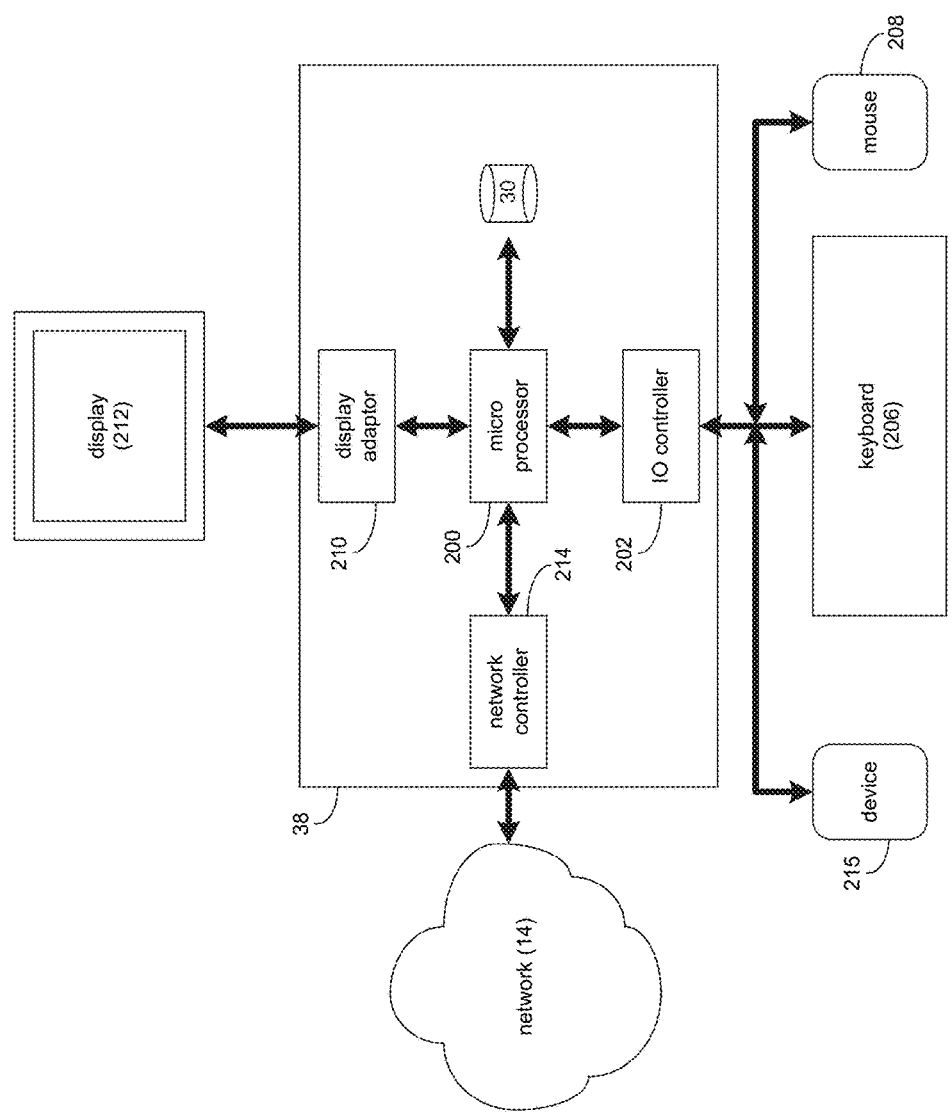
FIG. 2 is an example diagrammatic view of a client electronic device of FIG. 1 according to one or more example implementations of the disclosure.

Referring also to FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, BT process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

In certain environment (e.g., a distributed programming environment), the response times of the application, or the overall throughput that the environment may process, may be dictated by the slowest part of that distributed environment. For instance, with Streams programming, the overall operator graph may be slowed down by the weakest link. This weakest link may be evidenced by the "backpressure" that exists, which may be effectively the queue of tuples waiting to be processed one-by-one by an operator. With the nascent introduction of hardware acceleration to stream computing, there may arise a situation where the data transfer to and from programmable hardware, such as FPGAs, may potentially take longer than the actual processing of that data by the FPGA, thereby erasing potential performance gains. Thus, as will be discussed in greater detail below, the present disclosure may be used to intelligently handle backpressure in the case of, e.g., FPGAs. While the present disclosure may be described using FPGAs, it will be appreciated that other examples of hardware accelerators may be used without departing from the scope of the present disclosure.

Figure 3:
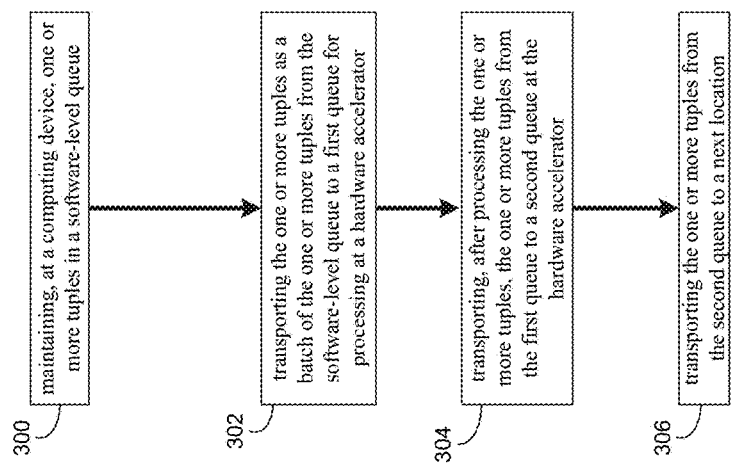
FIG. 3 is an example flowchart of the batch transport process of FIG. 1 according to one or more example implementations of the disclosure.
Figure 4:
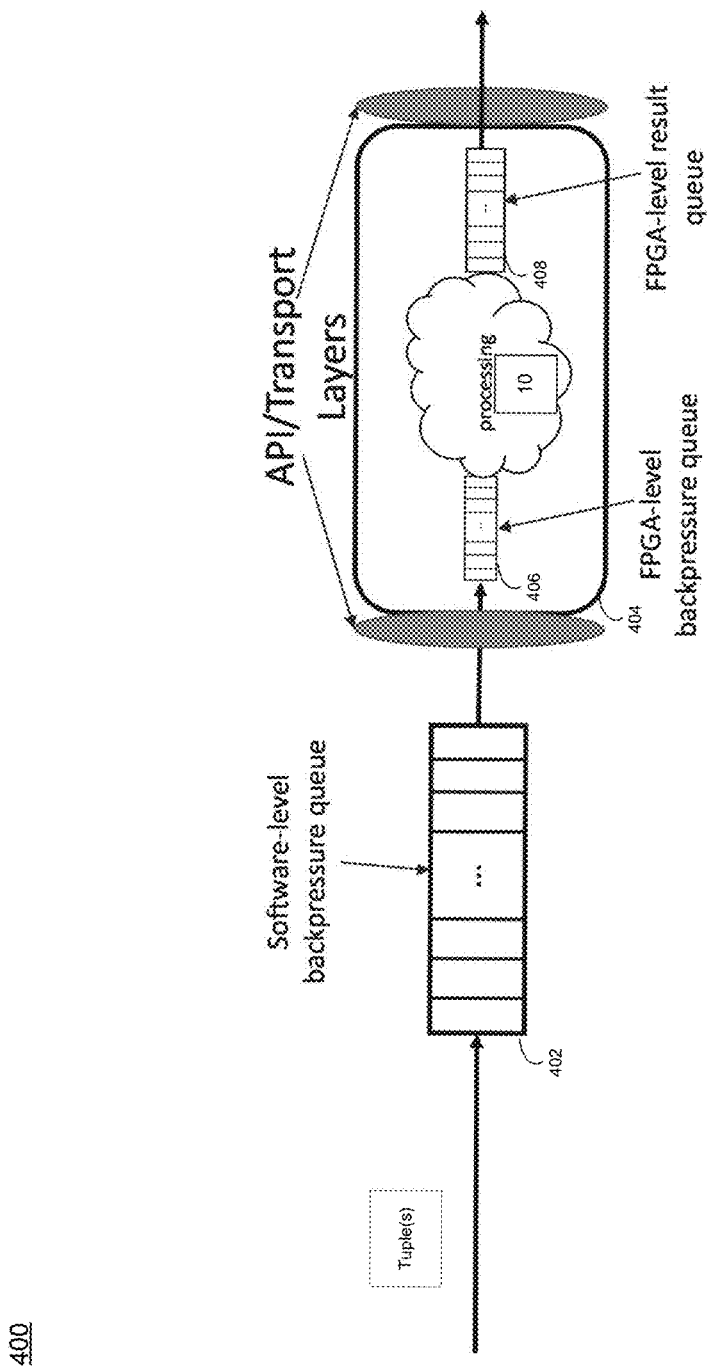
FIG. 4 is an example environment 400 according to one or more example implementations of the disclosure.

The BT Process:

As discussed above and referring also at least to the example implementations of FIGS. 3-4, batch transport (BT) process 10 may maintain 300, at a computing device, one or more tuples in a software-level queue. BT process 10 may transport 302 the one or more tuples as a batch of the one or more tuples from the software-level queue to a first queue for processing at a hardware accelerator. After processing the one or more tuples, BT process 10 may transport 304 the one or more tuples from the first queue to a second queue at the hardware accelerator. BT process 10 may transport 306 the one or more tuples from the second queue to a next location.

In some implementations, BT process 10 may maintain 300, at a computing device (e.g., computer 12), one or more tuples in a software-level queue. For instance, and referring at least to FIG. 4, an example environment 400 is shown. In the example, further assume that there is a backlog of tuples in the queue (e.g., software-level queue 402) waiting to be processed by the operator that runs on programmable hardware (e.g., a hardware accelerator, such as FPGA 404). In some implementations, BT process 10 may go through phases of backpressure, where BT process 10 may not be able to keep up with all of the incoming data, resulting in backpressure. In some implementations, as backpressure is being experienced, BT process 10 may maintain 300 the tuples in software-level queue 402 as they arrive to the FPGA operator. In some implementations, the use of software-level queue 402 may indicate backpressure, which may be monitored by BT process 10 (e.g., via resource manager application 20). In the example, the operator that runs on FPGA 404 may include BT process 10. Thus, in the example, there may be a situation where there is a FPGA operator that is the slowest point in an operator graph.

In some implementations, BT process 10 may transport 302 the one or more tuples as a batch of the one or more tuples from the software-level queue to a first queue for processing at a hardware accelerator. For example, BT process 10 may transport 302 some or all of the tuples from software-level queue 402 to the first queue in the hardware accelerator. In some implementations, BT process 10 may change the one or more tuples into a batch for transport 302 to the first queue. As will be discussed in greater detail, an API transport layer may exist between software-level queue 402 and the first queue. The API layer (e.g., via BT process 10) may change the one or more tuples into a batch by emptying one or more of the tuples in software-level queue 402 into a data structure (e.g., a queue data structure), where that data structure may be transported down to the hardware accelerator. When this data structure reaches the hardware accelerator, BT process 10 may unload the tuples from the data structure into the first queue for processing.

In some implementations, the first queue may include a hardware accelerator-level backpressure queue. In the example, the hardware accelerator-level backpressure queue (e.g., hardware accelerator-level backpressure queue 406) may be at the programmable hardware level of the hardware accelerator, and may contain the local backlog of tuples waiting to be processed (e.g., by BT process 10).

In some implementations, an API transport layer between software-level queue 402 and the first queue (e.g., hardware accelerator-level backpressure queue 406) may transport 302 the one or more tuples from software-level queue 402 to hardware accelerator-level backpressure queue 406 for processing. In some implementation, the tuples may be transported 302 from software-level queue 402 to hardware accelerator-level backpressure queue 406 as fast as possible taking into account certain system limitations (e.g., bandwidth). In some implementations, it may take about the same amount of time to transport 302, e.g., 5 tuples, to the programmable hardware layer as it does to transport, e.g., 1 tuple. Thus, in the example, BT process 10 may transfer the entire content of software-level backpressure queue 402 to hardware accelerator-level backpressure queue 406 every time any tuple is transported 302 through the hardware accelerator API layer. In some implementations, the API transport layer between software-level backpressure queue 402 and hardware accelerator-level backpressure queue 406 may manage (e.g., via BT process 10) removal from the software queue, transport 302, and insertion into hardware accelerator-level backpressure queue 406.

In some implementations, e.g., where there is no backpressure due to the system keeping up with data rates, then transporting 302 the entire queue may mean transporting one tuple at a time. For instance, in the example of a freely flowing streams graph without any backpressure, this same implementation may be applied. In the example, there may be queue sizes of one tuple at a time and BT process 10 may transport 302 one tuple at a time. In some implementations, the above-noted API layer (e.g., via BT process 10) may also optimize for performance by choosing optimal batch sizes for transport 302. For example, if transporting 302 all tuples in software-level backpressure queue 402 to hardware accelerator-level backpressure queue 406 is not optimal, and/or if hardware accelerator-level backpressure queue 406 is full, BT process 10 (e.g., via the API layer) may manage the queue sizes, such that a batch with a minimum to maximum number of tuples in the batch may be transported 302. Thus, the transport interface API layer may enable the transport 302 of a dynamic number of queue elements (each element being a tuple).

In some implementations, the hardware accelerator may include a Field-Programmable Gate Array. It will be appreciated that other types of hardware accelerators may be used without departing from the scope of the disclosure. As such, the description of using a Field-Programmable Gate Array (FPGA) should be taken as example only and not to otherwise limit the scope of the disclosure.

In some implementations, after processing the one or more tuples, BT process 10 may transport 304 the one or more tuples from the first queue to a second queue at the hardware accelerator. For instance, in some implementations, the second queue may include a hardware accelerator-level result queue. The elements (e.g., tuples) in hardware accelerator-level backpressure queue 406 may be processed (e.g., via BT process 10) sequentially, and processed tuples may be transported 304 in the output "awaiting transport" queue (e.g., hardware accelerator-level result queue 408). In some implementations, hardware accelerator-level result queue 408 may be at the programmable hardware level. In some implementations, BT process 10 may wait until hardware accelerator-level result queue 404 has the same number of tuples as transported to software-level backpressure queue 402, and then transport 304 them as a batch of tuples to hardware accelerator-level result queue 408. For instance, assume for example purposes only that 5 tuples have been transported to software-level backpressure queue 402. In the example, BT process 10 may wait until hardware accelerator-level result queue 404 has the same number of received tuples (e.g., 5), and then transport 304 them as a batch of tuples to hardware accelerator-level result queue 408.

In some implementations, the above-noted API layer (e.g., via BT process 10) may also optimize for performance by choosing optimal batch sizes for transport 304. For example, if transporting 304 all tuples in hardware accelerator-level backpressure queue 406 to hardware accelerator-level result queue 408 is not optimal, and/or if hardware accelerator-level result queue 408 is full, BT process 10 (e.g., via the API layer) may manage the queue sizes, such that a batch with a minimum to maximum number of tuples in the batch may be transported 304. Thus, the transport interface API layer may enable the transport 304 of a dynamic number of queue elements (each element being a tuple).

In some implementations, BT process 10 may transport 306 the one or more tuples from the second queue to a next location. In some implementations, the next location may include the network interface. In some implementations, the next location may include a software layer to a subsequent operator. In some implementations, the tuple(s) processed may be transported 306 directly from hardware accelerator-level result queue 408 to the software layer and on to the next (e.g., subsequent) operator in its entirety (or to the network interface) with every transport 306 operation. Similarly to transporting 302 tuples from software-level backpressure queue 402 to hardware accelerator-level backpressure queue 406, BT process 10 may wait until hardware accelerator-level result queue 408 has the same number of tuples as transported to hardware accelerator-level backpressure queue 406, and then transport 306 them as a batch back to the software layer or directly to the network interface. For instance, assume for example purposes only that 5 tuples have been transported to hardware accelerator-level backpressure queue 406. In the example, BT process 10 may wait until hardware accelerator-level result queue 408 has the same number of received tuples (e.g., 5), and then transport 306 them as a batch of tuples to the software layer or directly to the network interface.

In some implementations, the above-noted API layer (e.g., via BT process 10) may also optimize for performance by choosing optimal batch sizes for transport 306. For example, if transporting 306 all tuples in hardware accelerator-level result queue 408 to the software layer (or network interface) is not optimal, and/or if the software layer (or network interface) is itself backed up, BT process 10 (e.g., via the API layer) may manage the queue sizes, such that a batch with a minimum to maximum number of tuples in the batch may be transported 306. Thus, the transport interface API layer may enable the transport 306 of a dynamic number of queue elements (each element being a tuple).

In some implementations, an API transport layer between the second queue and the next location may manage changing the batch of the one or more tuples from a data structure into a stream of the one or more tuples. For instance, the above-noted API transport layer between hardware accelerator-level result queue 408 and the stream to the next operator may (e.g., via BT process 10) manage changing the transported 304 tuples into a stream of tuples for consumption by the next operator in the series. For instance, assume for example purposes only that the API layer between hardware accelerator-level result queue 408 and the stream to the next operator (e.g., via BT process 10) may change the one or more tuples (e.g., again) into a batch by emptying one or more of the tuples in hardware accelerator-level result queue 408 into a data structure (e.g., a queue data structure). In the example, that data structure may be transported 306 to the software level as a batch. The API may then remove each tuple from the data structure and submit each tuple individually, in the order received, to the next operator/operators in the streaming graph.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer program product residing on a non-transitory computer readable storage medium having a plurality of instructions stored thereon which, when executed across one or more processors, causes at least a portion of the one or more processors to perform operations comprising:
    maintaining one or more tuples in a software-level queue;
    transporting the one or more tuples as a batch of the one or more tuples from the software-level queue to a first queue of a hardware accelerator for processing at the hardware accelerator;
    transporting, after processing the one or more tuples, the one or more tuples from the first queue to a second queue at the hardware accelerator; and
    transporting the one or more tuples from the second queue to a next location.

2. The computer program product of claim 1 wherein the first queue includes a hardware accelerator-level backpressure queue.

3. The computer program product of claim 1 wherein the second queue includes a hardware accelerator-level result queue.

4. The computer program product of claim 1 wherein the next location includes a software layer to a subsequent operator.

5. The computer program product of claim 1 wherein the hardware accelerator includes a Field-Programmable Gate Array.

6. The computer program product of claim 1 wherein an API transport layer between the software-level queue and the first queue transports the one or more tuples from the software-level queue to the first queue for processing.

7. The computer program product of claim 1 wherein an API transport layer between the second queue and the next location manages changing the batch of the one or more tuples into a stream of the one or more tuples.

8. A computing system including one or more processors and one or more memories configured to perform operations comprising:
- maintaining, at a computing device, one or more tuples in a software-level queue;
- transporting the one or more tuples as a batch of the one or more tuples from the software-level queue to a first queue of a hardware accelerator for processing at the hardware accelerator;
- transporting, after processing the one or more tuples, the one or more tuples from the first queue to a second queue at the hardware accelerator; and
- transporting the one or more tuples from the second queue to a next location.

9. The computing system of claim 8 wherein the first queue includes a hardware accelerator-level backpressure queue.

10. The computing system of claim 8 wherein the second queue includes a hardware accelerator-level result queue.

11. The computing system of claim 8 wherein the next location includes a software layer to a subsequent operator.

12. The computing system of claim 8 wherein an API transport layer between the software-level queue and the first queue transports the one or more tuples from the software-level queue to the first queue for processing.

13. The computing system of claim 8 wherein an API transport layer between the second queue and the next location manages changing the batch of the one or more tuples into a stream of the one or more tuples.

\* \* \* \* \*